US007390559B2

(12) United States Patent
Mayo et al.

(10) Patent No.: US 7,390,559 B2

(45) Date of Patent: Jun. 24, 2008

(54) MULTILAYER COATING SYSTEM

(75) Inventors: Michael A. Mayo, Pittsburgh, PA (US); M. Lisa Perrine, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 332 days.

(21) Appl. No.: 10/972,130

(22) Filed: Oct. 22, 2004

(65) Prior Publication Data

US 2006/0088721 A1 Apr. 27, 2006

(51) Int. Cl.

| | |
|---|---|
| ***B32B 7/10*** | (2006.01) |
| ***B32B 27/08*** | (2006.01) |
| ***B32B 27/16*** | (2006.01) |
| ***B32B 27/30*** | (2006.01) |

(52) U.S. Cl. .................... 428/212; 428/411.1; 428/420; 428/523

(58) Field of Classification Search ................. 428/212, 428/411.1, 523, 420; 427/493

See application file for complete search history.

(56) References Cited

U.S. PATENT DOCUMENTS

| | | | | |
|---|---|---|---|---|
| 5,149,592 | A * | 9/1992 | Wojnarowicz | 428/447 |
| 6,737,468 | B1 | 5/2004 | Bremser | 524/547 |
| 7,122,595 | B1 * | 10/2006 | Ott et al. | 524/502 |
| 2003/0078316 | A1 | 4/2003 | Bradford et al. | 522/126 |
| 2004/0208998 | A1 | 10/2004 | Steininger et al. | 427/372.2 |

FOREIGN PATENT DOCUMENTS

WO WO 0050519 A1 * 8/2000

* cited by examiner

*Primary Examiner*—Ramsey Zacharia

(74) *Attorney, Agent, or Firm*—Diane R. Meyers

(57) ABSTRACT

A multilayer coating system is disclosed. The first layer is a thermally curable layer comprising one or more thermally curable groups and one or more radiation curable groups. The second layer comprises a radiation curable resin.

23 Claims, No Drawings

MULTILAYER COATING SYSTEM

FIELD OF THE INVENTION

The present invention relates to multilayer coating systems.

BACKGROUND INFORMATION

There are many industries and applications for which multilayer coatings are desired. "Color-plus-clear" coating systems involving the application of a colored or pigmented base coat to a substrate followed by application of a transparent or clear topcoat over the basecoat have become increasingly popular as original finishes for a number of consumer products including color, for example, cars, appliances and floor coverings such as ceramic tiles and wood flooring. The color-plus-clear coating systems have outstanding appearance properties, including gloss and distinctness of image, due in large part to the clearcoat. In other applications, coatings having different properties may be utilized in a multicoat system. For example, one of the coats used in a multilayer coating system may be more durable, or provide better weatherability than another of the coats. It is desirable in all of these applications to have good adhesion between the various layers.

SUMMARY OF THE INVENTION

The present invention is directed to a multilayer coating system comprising:

(A) a first thermally curable coating comprising a resin to which is attached one or more thermally curable groups and one or more radiation curable groups; and (B) a second radiation curable coating comprising a radiation curable resin, wherein the weight percent of radiation curable groups in the first coating is below that which is needed to render the first coating radiation curable.

DETAILED DESCRIPTION OF THE INVENTION

The present invention is directed to a multilayer coating system comprising: A) a first thermally curable coating comprising a film-forming resin to which is attached one or more thermally curable groups and one or more radiation curable groups, and B) a second radiation curable coating comprising a radiation curable resin. The weight percent of radiation curable groups in the first coating is below that which is needed to render the first coating radiation curable.

The first coating of the present multilayer coating system can be either a one-component or "1K" system or a two-component or "2K" system. For the 1K system, the thermally curable group(s) can be self-curing, such as at ambient or elevated temperatures, or can cure in the presence of a curing agent at ambient or elevated temperatures. For 2K systems, the curing agent or agents ("curing agent pack") are kept separate from the reactive thermally curable group(s) ("resin pack"); the packs are combined shortly before application. Following mixture of the resin pack with the curing agent pack, and application of the resulting mixture oh the substrate, the substrate can then optionally be thermally treated to facilitate cure of the curing agent(s) with the thermally curable group(s).

The thermally curable group(s) and the radiation curable group(s) are on the same film-forming resin, sometimes referred to herein as the "first film-forming resin". Any film-forming resin having one or more thermally curable functional groups can be used according to the present invention, provided such resin either has or can be modified to have a radiation curable group or groups attached thereto. As used herein, the term "thermally curable" and variants thereof refer to coatings and/or groups that can be cured or crosslinked at ambient or elevated temperatures and not by actinic radiation. Examples of polymers having thermally curable groups include hydroxyl or carboxylic acid-containing acrylic copolymers, hydroxyl or carboxylic acid-containing polyester polymers, isocyanate or hydroxyl-containing polyurethane polymers, and amine or isocyanate containing polyureas. These polymers are further described in U.S. Pat. No. 5,939,491, column 7, line 7 to column 8, line 2; this patent, as well as the patents referenced therein, are incorporated by reference herein. Curing agents for these resins are also described in the '491 patent at column 6, lines 6 to 62. Combinations of curing agents can be used. Particularly suitable is a resin comprising isocyanate groups and a curing agent comprising hydroxy groups, or vice versa.

In certain, nonlimiting embodiments, the first coating comprises, in addition to the first film-forming resin, a second film-forming resin. Any film-forming resin having one or more thermally curable functional groups can be used as the second film-forming resin according to the present invention, including those discussed above. The first and second film-forming resins can be the same, except for the radiation curable group(s) being present on the first but not the second film-forming resin. The first and second film-forming resins can be different in ways other than the presence of the radiation curable group(s); for example, the resin backbone can be the same or different and/or the thermally curable group(s) on each of the resins can be the same or different. An appropriate curing agent or agents can be selected by one skilled in the art, depending on the thermally curable group(s) on the film-forming resin(s). If there are two film-forming resins and the thermally curable group(s) on each of the film-forming resins are the same, one curing agent may be sufficient, but if the thermally curable group(s) on each of the film-forming resins are different, two or more curing agents may be used. There is no limit to the number of curing agents used according to the present invention. Similarly, there is no limit to the number of film-forming resins used according to the present invention; use of one or two film-forming resins reflects just certain nonlimiting embodiments.

As noted above, the first film-forming resin contains or is "modified" to contain radiation curable group(s). As used herein, the term "radiation curable group(s)" refers to functional group(s) that can react, such as via an addition reaction, upon exposure to actinic radiation, such as UV radiation or electron beam radiation. Examples of such groups include but are not limited to acrylates, methacrylates, vinyl ethers, ethylenically unsaturated resins, maleic unsaturated polyesters, fumarates, thiols, alkenes, epoxies, and the like. "(Meth)acrylate" and like terms are used herein to refer to both acrylate and methacrylate. "Modified" and like terms refer to the covalent bonding of the radiation curable group(s) to the resin. Thus, the radiation curable groups are physically attached to the resin, in contrast to being merely mixed with them. This physical attachment is believed to contribute to good adhesion properties observed with the present multilayer system, although the inventors do not wish to be bound by any mechanism. It will be understood that covalent bonding of the radiation curable group(s) to the resin is achieved such that the radiation curable group(s) are still reactive upon exposure to radiation.

The first coating of the present invention comprises radiation curable group(s) in a weight percent below that which is needed to render the coating radiation curable. The appropriate amount of radiation curable group(s) on the first resin can be determined by one skilled in the art. In certain embodiments, the amount of carbon-carbon double bonds on the resin is seven percent or less; that is, seven percent or less of the total weight of the resin, based on solids, is carbon-carbon double bonds.

It will be appreciated that "dual cure" resins, comprising both thermally curable group(s) and radiation curable group(s), are known in the art. These resins, as the name implies, undergo two different types of cure. One cure mechanism is a thermal cure, such as through use of a curing agent and/or the application of heat; the second cure mechanism is through exposure to actinic radiation. The result of the dual cure is the formation of two interpenetrating networks, one of which is based on the thermally cured group(s) and the other of which is based on the radiation curable group(s). The weight percent of radiation curable group(s) used in the first coating according to the present invention is not high enough to render the first coating dual cure; the first coating is only thermally curable. Thus, if the first coating was exposed to actinic radiation, it would not cure; "cure" as used in reference to a coating refers to a reaction between the components such that they resist melting upon heating. Thus, the reaction between radiation curable group(s) in the first coating that might occur in isolated spots upon exposure to actinic radiation would not be sufficient to impart melt resistance to the coating upon heating. Rather, the first film-forming resin cures by crosslinking of the thermally curable group(s).

The first film-forming resins comprising one or more thermally curable group(s) and one or more radiation curable group(s) can be prepared by reacting a first material and a second material. The first material may contain at least one radiation curable group and at least one nonradiation curable group capable of reaction with the second material. The second material may contain at least one functional group capable of reacting with the non-radiation curable group on the first material. One nonlimiting embodiment includes the reaction of a hydroxy functional acrylate with a polyisocyanate, resulting in a resin-containing isocyanate functionality and acrylate functionality on the same molecule. An acrylate functional isocyanate is also commercially available from Bayer in their ROSKYDAL line.

In certain nonlimiting embodiments of the present invention, the first film-forming resin comprises at least one isocyanate having one or more ethylenically unsaturated moieties and one or more isocyanate ("NCO") groups. The NCO group(s) can be free or blocked. In these embodiments, the first film-forming resin will typically be in a first or resin pack, and a curative for the isocyanate will typically be in a second or curing agent pack, with the two packs being mixed just prior to application. Examples of ethylenically unsaturated isocyanates include (meth)acryloxy isocyanate. In other nonlimiting embodiments, the resin comprises hydroxy groups and radiation curable groups and the coating comprises isocyanate. In other embodiments the two components can comprise, for example, polyepoxides and carboxylic acid acrylates; anhydrides and hydroxyacrylates; or aminoplasts and hydroxyacrylates.

The first coating, in addition to the one or more film-forming resins described above, can further comprise pigments, fillers, rheology modifiers, surface active agents, light stabilizers, catalysts, and other additives known to those skilled in the art, which are used to achieve specific end use performance properties. Additional resinous materials may also be present such as crosslinkers and film-forming resins different from the film-forming resins described above. Solvents and diluents may also be used. The film-forming resin(s) generally comprises 5 to 95 weight percent, such as 25 to 60 weight percent of the first coating. Curing agent(s), if used, typically comprise 5 to 95 weight percent, such as 25 to 75 weight percent of the first coating. Other ingredients in the first coating, if used, are typically present in an amount of up to 50 weight percent of the first coating. All of these weight percents are solid weight percentages of the total solid weight of the coating.

The second coating used in the multilayer coating system of the present invention comprises a radiation curable resin. As used herein, the term "radiation curable resin" and like terms refer to any film-forming resin that can be cured by actinic radiation. Actinic radiation includes but is not limited to UV radiation, electron beam radiation, and even visible light curing depending on the initiator(s) used. Examples of radiation curable resins include those that contain ethylenic unsaturation, such as acrylate or methacrylate groups, fumarate groups, vinyl ether groups, maleate groups, thiol groups, alkenes, epoxies and the like. In one embodiment, the second coating is not a UV curable ink.

The second coating of the present invention, in addition to the radiation curable resin, can comprise other ingredients including one or more of pigments, inert fillers, flatting gents, colorants, flow additives, defoamers, solvents, and the like. The radiation curable resin generally comprises 40 to 99 or 100 weight percent, such as 80 to 97 weight percent, while the other additives generally comprise 60 to 0 or 1 weight percent, such as 20 to 3 weight percent, with weight percent expressed here in terms of the total weight of the second coating.

The present invention is further directed to a method for preparing a multilayer coating system as described above. The coatings described herein, as well as other coatings known in the art, can be applied to at least a portion of the substrate, and can be applied to the substrate directly or over at least a portion of a preexisting coating layer. Certain embodiments generally comprise applying a first coating to a substrate. The first coating, as described above, comprises both thermally curable group(s) and radiation curable group(s) in a weight percent below that which is needed to render the coating radiation curable. The coating is formulated and mixed by means known to those skilled in the art, and can be applied to the substrate through any manner known in the art, such as spray coating, roll coating, brushing, dipping, casting/spin coating, electrostatic coating, flow coating and the like. Following application of the first coat, the substrate is subjected to a thermal cure. Thermal cure can occur at ambient or elevated temperatures. Thermal cure is affected so as to react the majority of the thermally curable group(s) with the curing agent(s). While the majority of the thermally curable groups will react, it is recognized in the art that some of the thermally curable groups may not react completely upon exposure to the cure conditions, but may continue to react slowly over time (i.e. "post-cure"); it is further recognized that it is unlikely that 100% of the groups will undergo reaction. The term "fully cured" as used herein therefore does not mean that 100% of the groups have cured, but rather a majority as described above.

Following completion of the thermal cure, a second coating comprising a radiation curable resin is applied to the substrate so as to be at least partially in contact with the first coating. The second coating is as described above, and can also be applied using spray coating, roll coating, brushing, dipping, casting/spin coating, electrostatic coating, flow coating and the like. Following application of the second coating, the substrate is subjected to actinic radiation at an irradiance (peak intensity) and a dose (energy density) sufficient to effect cure of the radiation curable resin. This will typically be a dose of 100 to 2000 millijoules/$cm^2$ at an irradiance of 100 to 1200 milliwatts/$cm^2$. One skilled in the art can determine the appropriate dose, irradiance, actinic radiation source and the like to effect cure depending on the particular coating selected.

While affecting cure of the radiation curable resin of the second coating, the exposure to actinic radiation will also cause the radiation curable group(s) in the first coating to react with and bond to radiation curable group(s) in the second coating. Intercoat adhesion between the first coating and second coating is believed to result from this cross-curing of the radiation curable group(s) in each of the layers. The physical attachment of the radiation curable group(s) to the first film-forming resin in the first coating is also believed to aid in intercoat adhesion; the cross-cured radiation group(s) are physically attached to the cured first coating, and therefore are believed to be more durable than if, for example, the radiation curable group(s) were simply mixed with a thermally curable resin.

It will be appreciated that in certain nonlimiting embodiments of the present invention, the radiation cure can be affected first and the thermal cure affected second, rather than the thermal cure and then radiation cure as described above.

In one embodiment of the invention, the first coating contains pigment and the second coating is lightly pigmented or unpigmented. The first coating can be deposited and cured and the second coating deposited and cured, or the second coating can be deposited on an uncured or partially cured first coating and the two layers can be cured concurrently or sequentially with either actinic radiation followed by thermal cure or vice versa. It would also be possible for both coats to be unpigmented or even lightly pigmented. "Lightly pigmented" and similar terms refer to pigmented systems in which actinic radiation can still penetrate; such systems can contain, for example, pigments that are relatively light in color or that contain relatively small concentrations of pigment. In the case of unpigmented or lightly pigmented coatings, the radiation curable coating layer could be deposited first and the thermally curable layer having radiation curable moieties deposited thereon in a "wet on wet" application. The two layers could then be cured concurrently or sequentially with either the actinic radiation followed by thermal cure or vice versa. It will be appreciated by those skilled in the art that if the radiation curable coating is deposited first, enough light must be transmitted through the second coating to allow cure of the underlying layer. Regardless of the order of application of the coatings and cure, the thermally curable layer will have the majority of the thermal groups reacted in certain embodiments.

The multilayer coating system of the present invention can be applied to a variety of substrates and used in a variety of applications such as golf ball coatings, automotive or other plastic parts with pigmented thermally cured basecoat and radiation curable clearcoat, consumer electronics with pigmented thermally cured basecoat and radiation curable topcoat and the like.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. Also, as used herein, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

Clear Topcoat: Polyol Package

| COMPONENT | QUANTITY/POUNDS |
|---|---|
| Diisobutyl ketone | 154.611 |
| Methyl isobutyl ketone | 254.116 |
| Optical brightener[1] | 1.674 |
| Cellulose acetate butyrate[2] | 10.087 |
| Must mix well to dissolve the CAB at this point before continuing. | |
| TINUVIN 328[3] | 9.367 |
| Must mix well to dissolve the TINUVIN 328 at this point before continuing. | |
| HRB 4856 Polyol[4] | 292.470 |
| TERATHANE 1000[5] | 30.610 |
| TOTAL | 752.935 |

[1]RC-B Thiopene, from Wujin Fine Chemicals or Q-OB from NY Fine Chemicals.
[2]CAB 551.0.2 PM3024 from Eastman Chemical.
[3]Benzotriazole UV absorber from Ciba Additives.
[4]Polyester-urethane polyol available from PPG Industries, Inc.
[5]Polyether polyol available from DuPont.

Example 2

Clear Topcoat at High Solids: Polyol Package

| COMPONENT | QUANTITY/POUNDS |
|---|---|
| Diisobutyl ketone | 146.13 |
| Methyl isobutyl ketone | 224.99 |
| Optical brightener | 1.80 |
| Cellulose acetate butyrate | 10.87 |
| Must mix well to dissolve the CAB at this point before continuing. | |
| TINUVIN 328 | 10.09 |
| Must mix well to dissolve the TINUVIN 328 at this point before continuing. | |
| HRB 4856 Polyol | 315.12 |
| TERATHANE 1000 | 32.98 |
| Methyl isobutyl ketone | 17.32 |
| TOTAL | 759.30 |

Example 3

All parts are by weight unless otherwise specified:

| System I: | |
|---|---|
| PRIMER: | 100 parts BZ-303-23 Waterborne Polyurethane Clear[6]<br>1.5 parts Aziridine Crosslinker[7] |

-continued

| | |
|---|---|
| CLEAR TOPCOAT: | 100 parts Polyol Package from Example 1<br>32.9 parts DESMODUR N 3390[8]<br>Mix well and spray immediately |
| System II: | |
| PRIMER: | 100 parts BZ-303-23 Waterborne Polyurethane Clear<br>1.5 parts Aziridine Crosslinker |
| CLEAR TOPCOAT: | 100 parts Polyol Package from Example 2<br>63.7 parts modified polyisocyanate.[9]<br>Mix well and spray immediately |

[6]WPU60499, version 000 available from PPG Industries, Inc.
[7]CX100 Aziridine crosslinker available from NeoResins.
[8]Polyisocyanate crosslinker available from Bayer Corporation.
[9]Adduct of 2016 parts DESMODUR N 3300 and 106.1 parts Hydroxyethylacrylate; solid NCO equivalent weight = 192; thinned to 60% solids in methyl isobutyl ketone.

The pigmented primers could be spray applied to polyurethane covered substrates or other suitable substrates in a manner allowing for a consistency of between 0.3 and 0.7 mils uniformly on the surface of the substrate. The primers could be flash dried for 10 to 20 minutes at 70 to 75° F. and then baked for 30 minutes at 120° F. The two component clearcoats could be mixed thoroughly and then each spray applied to the primed substrates in a similar manner as for the primer within 30 minutes of mixing the two components of the clearcoat. The clearcoats can be applied to a film thickness of 0.15 to 0.45 mils. The primed and clearcoated substrates could then be flashed for 10 to 20 minutes at 70 to 75° F. and baked for 16 hours at 110° F. A UV curable coating can then be applied to the substrates. Suitable UV coatings include, for example, R1162Z74 UV coating, commercially available from PPG Industries, Inc. The UV coating can be applied using standard means, so as to form a coating having a dry film thickness 15 to 20 microns. The coating can be cured as appropriate, such as by exposure to 850 mJ/cm$^2$ using 80 W/cm medium pressure mercury UV curing lamps (part no. 25-20008-E), available from Western Quartz Products, Inc. If the substrates are subjected to adhesion tests, the adhesion between the UV coating and system II would be expected to be greater than that of the adhesion between the UV coating and system I.

Whereas particular embodiments of this invention have been described above for purposes of illustration, it will be evident to those skilled in the art that numerous variations of the details of the present invention may be made without departing from the invention as defined in the appended claims.

Therefore, what is claimed is:

1. A multilayer coating system comprising:

(A) a first, thermally cured coating, said first coating being produced from a first film forming resin having one or more thermally curable groups and one or more radiation curable groups; and (B) a second, radiation cured coating comprising a radiation cured resin;

wherein at least some radiation curable groups in the first coating are bonded to at least some of the radiation cured resin of the second coating and the weight percent of radiation curable group(s) in the first coating is below that which is needed to render the first coating radiation curable.

2. The multilayer coating system of claim 1, wherein the thermally curable group(s) comprise hydroxy group(s).

3. The multilayer coating system of claim 1, wherein the thermally curable group(s) comprise isocyanate group(s).

4. The multilayer coating system of claim 1, wherein the radiation curable group(s) of the first coating or the second coating or both comprise (meth)acrylate group(s).

5. The multilayer coating system of claim 1, wherein the first coating is pigmented and the second coating is not pigmented or is lightly pigmented.

6. The multilayer coating system of claim 1, wherein neither the first coating nor the second coating comprise pigment.

7. The multilayer coating system of claim 1, wherein the weight percent of radiation curable group(s) in the first coating is seven or less, with weight percent based on the total solid weight of the first film-forming resin.

8. The multilayer coating system of claim 1, wherein the first coating further comprises a second film-forming resin comprising one or more thermally curable group(s) that are the same or different than the thermally curable group(s) on the first film-forming resin.

9. The multilayer coating system of claim 8, wherein the thermally curable group(s) comprise hydroxy group(s).

10. The multilayer coating system of claim 8, wherein the thermally curable group(s) comprise isocyanate group(s).

11. The multilayer coating system of claim 8, wherein the radiation curable group(s) of the first coating or the second coating or both comprise (meth)acrylate group(s).

12. The multilayer coating system of claim 8, wherein the first coating is pigmented and the second coating is not pigmented or lightly pigmented.

13. The multilayer coating system of claim 8, wherein neither the first coating nor the second coating comprise pigment.

14. The multilayer coating system of claim 8, wherein the thermally curable group(s) and the radiation curable group(s) are in one component, and the first coating further comprises a second component comprising one or more curing agents for the thermally curable group(s).

15. The multilayer coating system of claim 14, wherein the first coating is pigmented and the second coating is not pigmented or is lightly pigmented.

16. The multilayer coating system of claim 14, wherein neither the first coating nor the second coating comprise pigment.

17. The multilayer coating system of claim 8, wherein the first coating comprises at least one isocyanate having one or more ethylenically unsaturated moieties and one or more isocyanate groups.

18. The multilayer coating system of claim 1, wherein the thermally curable group(s) and the radiation curable group(s) are in one component, and the first coating further comprises a second component comprising one or more curing agents for the thermally curable group(s).

19. The multilayer coating system of claim 18, wherein the first coating is pigmented and the second coating is not pigmented or is lightly pigmented.

20. The multilayer coating system of claim 18, wherein neither the first coating nor the second coating comprise pigment.

21. The multilayer coating system of claim 1, wherein the first coating comprises at least one isocyanate having one or more ethylenically unsaturated moieties and one or more isocyanate groups.

22. A method for preparing a multilayer coating system comprising applying to a substrate:

(A) a first, thermally curable coating comprising a resin to which is attached one or more thermally curable groups and one or more radiation curable groups; and (B) a second, radiation curable coating comprising a radiation curable resin;

wherein the weight percent of radiation curable group(s) in the thermally curable coating is below that which is needed to render the thermally curable coating radiation curable;

wherein either the coating of step A or the coating of step B is applied first, but when the coating of step B is applied first, the coating of step A is not pigmented or is lightly pigmented; and curing the multilayer coating system, such that at least some radiation curable groups in the first coating are bonded to at least some of the radiation cured resin of the second coating.

23. The method of claim 22, wherein the first applied layer is fully cured before application of the second layer.

* * * * *